April 9, 1935. R. F. GREENWOOD Re. 19,522

RAIL JOINT AND BAR THEREFOR

Original Filed Nov. 12, 1931

INVENTOR
Richard F. Greenwood
BY
Joseph B. O'Brien
ATTORNEY

Reissued Apr. 9, 1935

Re. 19,522

UNITED STATES PATENT OFFICE 19,522

RAIL JOINT AND BAR THEREFOR

Richard F. Greenwood, New York, N. Y., assignor to Standard Equipments, Inc., a corporation of Maryland Original No. 1,963,580, dated June 19, 1934, Serial No. 574,491, November 12, 1931. Application for reissue January 28, 1935, Serial No. 3,677

8 Claims. (Cl. 238—258)

This invention relates to improvements in rail joints and bars therefor, and particularly to that type of rail joint bar having a thick rigid medial section provided with integral end sections which are thinner or narrower than the medial section and which are adapted to be flexed inwardly to apply spring tension to the joint.

Among the objects of the invention are to produce a bar, of the type described, which is not rigid at its medial section but which is resilient and alive throughout its length, including its medial section, and which makes a joint that closely approaches in operation the characteristics of a continuous steel rail under load and that conducts wave motion practically as well as any free section of the rail; to produce a bar, of the type described, which engages between the heads and flanges of the opposing rail ends at and adjacent to such ends and which impinges or seats at this point on the underside of the rail heads and on the upper side of the rail flanges to cause a concentration at this point of the frictional and resilient interlocking engagement of the bar and to form a fulcrum relative to which the adjacent metal of the bar moves when the bar is clamped in place, in combination with resilient end sections that are thinner narrower and more resilient than said medial section of the bar and which have rail flange contacting surfaces that lie initially in the inclined plane occupied by the flange contacting surface of said medial section and which are adapted, upon being flexed by bolts, to travel inwardly and upwardly on said rail flanges whereby the bar is convexed vertically during such inward movement and whereby said end portions contact the rail flanges at varying levels differing sometimes from the level occupied by the flange engaging surface of said medial section; to produce a bar, of the type described, in which one or more of its end sections is provided with a vertically elongated hole that receives one of the bar bolts and which prevents bending and shearing of the bolts as the end section rises vertically when inwardly flexed; to produce a bar, of the type described, in which the medial section is longitudinally cambered or bowed at its top portion before application to the rail and in which the drawing in of said end sections of the bar causes the longitudinally cambered top portion to assume a rectilinear position substantially tangential to the initial camber or bow of said top portion, thus increasing the supporting contact between said top portion and the underside of the rail head; to produce a bar, of the type described, having a medial section provided with an inner web-contacting surface formed with an initial horizontal camber or bow, in combination with resilient end sections having cambered surfaces lying substantially within the horizontal arc of said camber or bow, which end sections, when flexed inwardly, will cause said web-contacting surface to approach a rectilinear line tangential to its initial camber or bow whereby the contacting surface between said rail web and the inner face of the bar is increased; to provide a bar, of the type described, which when applied has a tendency to crown the joint and to cause the wheels of the rolling equipment to roll out batter marks at the end of the rails providing smooth level rails across the joint, and which produces a concentration of frictional and tensional holding power at the central portion of the bar beneath the rail-head at the rail ends where the supporting power is most needed.

With these and other objects in view, the invention comprises the combination of members and arrangement of parts hereinafter described, pointed out in the appended claims, and illustrated in the accompanying drawing in which:—

Figure 1:
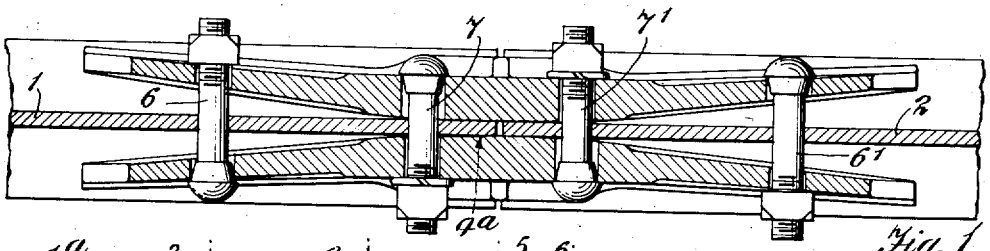
Figure 1 is a horizontal section through a rail-joint embodying my invention, the rail-joint bars having bolts inserted but not tightened.

Referring now to the drawing which illustrates a preferred embodiment of my invention, 1—2 indicates rails, the ends of which it is desired to join, and 3 indicates the rail-joint bar which is disposed across the meeting line of the rails and inserted between the flanges 1′, and the heads 1ᵃ of the rail. A pair of these bars is employed at each joint, one member of the bar being disposed, as stated, on each side of the rail. The bar is preferably formed of a drop steel forging instead of the usual rolled steel bar and is of such resilient properties throughout as not only to provide a strong connection between the rail ends but also to enable the application of powerful spring tension to the medial section 4 of the bar where it engages the rail heads and flanges. Each bar includes end sections or wing-ends 5, 5′ formed integral with the oblong medial section 4 and which are narrower vertically, thinner laterally, and more resilient than the medial section and which extend in spaced relationship to the webs of the rails, the spring tension aforesaid being produced by drawing these wing-ends inwardly, as by bolts 6—6′, along the incline of the rail flanges 1′, 2′. The end portions taper vertically from a point near the bolts 7—7′ outward, and they gradually decrease in thickness, with no abrupt offsets, from points near such bolts outward as shown particularly in Figure 1, and Figures 3–6. In these figures the bottom outline of the inner side or inner face of the bar illustrates this shape, which is for the purpose of preventing stress localization. From these figures it will also be noted that the wing-ends 5—5′ lie entirely inside the outer edge of the flange 1′ of the rail.

In the preferred form of my invention I provide the relatively thick resilient medial section 4 which spans or includes the bolt holes occupied by the bolts 7—7′ with a longitudinally cambered, bowed or arched rail-contacting top portion 4′ which, when the ends 5, 5′ are drawn inwardly as stated, is straightened out into a substantially rectilinear condition, forcing the outer portions $4^b$ and $4^c$ of the cambered top portion into contact with the underside of the head $1^a$, and concentrating the tension at said longitudinally cambered top portion. The top or apex of this portion 4′ is disposed directly beneath the rail head at a point preferably, though not necessarily, well within the centroid area. The inward movement of the wing-ends 5, 5′ described, not only provides a powerful spring tension which acts in a vertical direction on the rails 1—2 and on the bar 3 but also provides a powerful spring tension which is exerted on these parts in horizontal and upwardly oblique directions.

Figure 7:
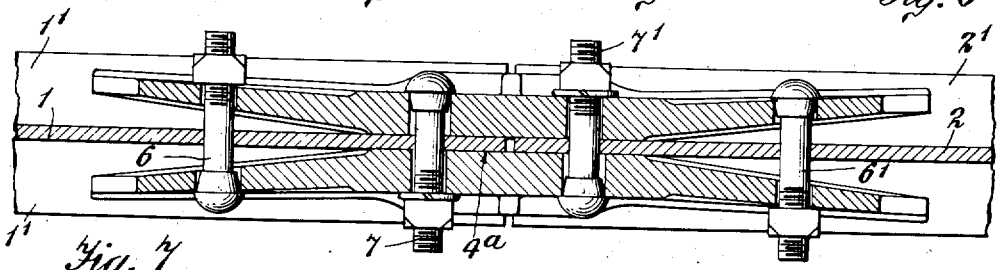
Figure 7 is a view similar to Figure 1 showing bolts drawn tight.

The inner or web contacting surface $4^a$, and the fillet-contacting surface $4^{a\prime}$, of the medial section 4 of my improved bar, are also longitudinally cambered bowed or arched so that, under some conditions of rail wear, or rail and rail-joint bar manufacturing tolerances, they contact initially with the web and fillet portions at the central part only of said medial section. The spring tension described is exerted to also straighten out these longitudinally arched or cambered portions $4^a$ and $4^{a\prime}$, which straightening out increases the web-contacting and fillet-contacting surfaces of the medial section 4 of the bar, and adds to the tensional contacting surfaces between the bar and the rail ends. In other words, when the four bolts 6—6′ and 7—7′ are drawn tight, as shown in Figure 7, these web and fillet contacting surfaces $4^a$ and $4^{a\prime}$ are converted into a horizontal rectilinear line which closely abuts against the web and fillet of the rail and the cambered portion 4′ is converted into a rectilinear surface which closely abuts against the underside of the head $1^a$ of the rail.

Figure 2:
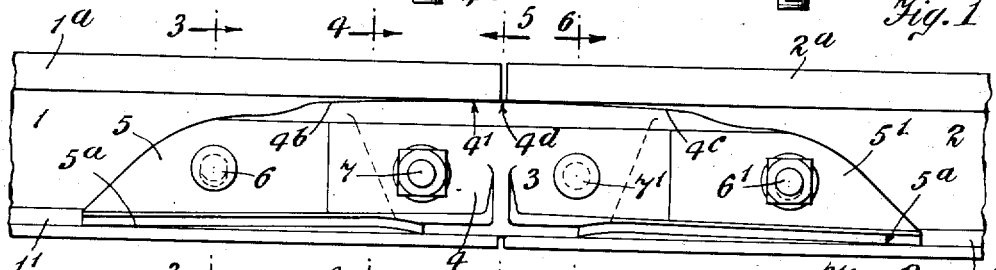
Figure 2 is a side elevation of the rail-joint shown in Figure 1.
Figure 3:
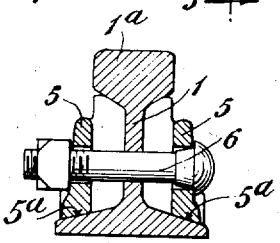
Figure 3 is a section on the line 3—3 of Figure 2 looking in the direction of the arrow.
Figure 4:
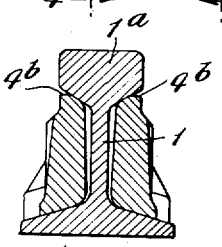
Figure 4 is a section on the line 4—4 of Figure 2.
Figure 5:
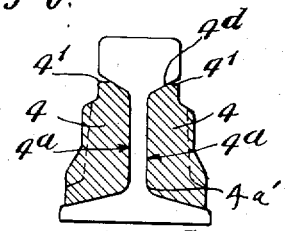
Figure 5 is a section on the line 5—5 of Figure 2 looking in the direction of the arrow.
Figure 6:
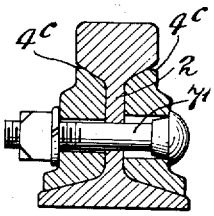
Figure 6 is a section on the line 6—6 of Figure 2 looking in the direction of the arrow.
Figure 8:
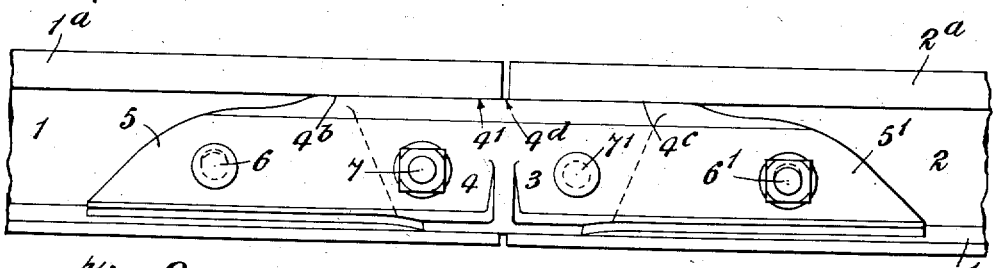
Figure 8 is a view similar to Figure 2 showing the position of the parts of the bars when bolts have been tightened up.

The bottom portions $5^a$ of the wing-ends 5, 5′ contact initially with the bottom of the incline of the flanges 1′, 2′ of the rails and, therefore, the initial condition of the bottom surface of the bar is substantially rectilinear. But when the wing ends are moved upwardly on the inclined upper face of the flanges 1′, 2′ by the end bolts 6—6′, this bottom portion is convexed and portions of it contact with and rest on the incline at varying levels thereof. That is to say, a horizontal line drawn transversely through the medial section 4 at the point where the vertical center of such section engages the flange 1′ (Figure 5), and a horizontal line drawn transversely through the bottom portion $5^a$ of the wing-end 5 at the point where the vertical center of such end engages the flange (Figure 3), will occupy different levels except when these points pass each other on inward movement of the wing-end 5. To prevent bending or shearing of the bolts during this upward movement of the wing ends, I mount the bolts 6—6′ in vertically elongated holes as shown in dotted lines in Figures 2 and 8.

The powerful spring tension produced by drawing in the wing-ends 5, 5′, as aforesaid, is exerted beneath the head portions of the rail ends so that the bar or bars have a tendency to slightly crown the joint. Each rail may be raised independently of the adjacent rail by applying more tension on the end bolts of the rail to be raised than to the end bolts of the other rail. This adjustment is more particularly desirable when my joint bars are applied to worn rails. Both rails may be raised equally by uniformly applying tension on both end bolts. This tension on the bar, which tends to vertical or longitudinal bowing thereof, with the vicinity of the points 4′ as the fulcrum relative to which the metal of the bar is adapted to move during such bowing, will be increased towards the vertical medial line of the medial section of the bar which lies directly beneath the joint, and will decrease in intensity toward the end portions $4^b$, $4^c$ of said medial section. Thus my invention produces an improved bar in which stress localization is prevented and which affords directly beneath the rail ends maximum resistance to and support of the dynamic load of rolling stock, and which also, instead of having a dead beam or dead spot effect, is resilient and alive throughout and produces a joint which develops and conducts wave motion similar to the wave motion and conduction produced in the free sections of the joined rails. It provides a concentration of the frictional and spring holding power of the bar at the central portion thereof beneath the rail-head where the supporting power is most needed, and produces rail joints which have a tendency to cause the wheels of the rolling equipment to roll out the battered rail-ends providing a smooth level rail across the joint.

It will be noted that all the cambered surfaces herein described extend longitudinally of the bar, and that the cambered back or web-contact surface $4^a$, and the cambered top surface 4′, have, as illustrated, different radii. The radius of the cambered top-surface 4′ is longer than the radius of the cambered surface $4^a$, and the radius of the fillet-contact surface $4^{a\prime}$ is proportional to the radii of the other two cambered surfaces. By reason of the varying fit tolerances that are unavoidable in rail and rail-joint bar manufacture, the inner surfaces $4^a$, $4^{a\prime}$ may at times stand away from the web of the rail during the "settling" or "working in" period of the bar.

Inasmuch as changes may be made in my invention without departing from its range or scope, it is desired that the foregoing description, the accompanying drawing, and the following claims, shall not be interpreted in a limiting sense.

What I claim is—

1. A rail-joint embodying, in combination, rails having abutting ends and provided with heads and with flanges having inclined surfaces, a bar comprising a relatively thick but resilient medial section and end sections which are more resilient than said medial section and which are adapted to be flexed inwardly toward the rails, said bar being provided in its untensioned condition at its said medial section with a longitudinally-cambered top-portion having a part thereof adapted in said untensioned condition to contact with the rail head to provide a portion of a fulcrum about which the metal of the bar will be moved upon inward flexing of the end sections, a longitudinally-cambered web-contacting back portion also having a part thereof adapted to contact with the web of the rail to provide a portion of said fulcrum about which the metal of the bar will be moved upon inward flexing of the end sections, and a longitudinally-cambered fillet-contacting portion also having a part thereof adapted to contact with the fillet of the rail to provide a portion of said fulcrum about which the metal of the bar will be moved upon inward flexing of the end sections, said bar having a bottom portion contacting at opposite ends with the flanges of the rails, and bolts for applying tension to move the end sections of said bar up the inclined surfaces of the rail flanges to cause said longitudinally-cambered portions to be straightened out simultaneously.

2. A rail connecting element having a relatively large resilient medial section associated with integral end sections of greater resiliency, bolting means for coupling said element to the rails, said element having, in untensioned condition a longitudinally-cambered rail head contacting portion, a longitudinally-cambered longitudinal upper fillet-contacting portion, and a longitudinally cambered web-contacting portion, the camber of the rail-head contacting portion being of longer radius than the camber of the web-contacting portion and the camber of the fillet-contacting portion being proportional in the length of its radius to the radii of the cambers of the head-contacting and web-contacting portions respectively, a part of one of said cambered portions being adapted in untensioned condition of the bar to contact with the rail and to provide a fulcrum about which the metal of the bar is adapted to be moved upon inward flexing of said end sections and a part of each of the other cambered portions being adapted successively to contact with the rail and to form part of said fulcrum, said bar having a bottom portion contacting at opposite ends with the flanges of the rails, and means for forcibly moving the end sections of said bar up the inclined surfaces of the rail flanges to cause the straightening out of said longitudinally cambered medial portion.

3. A rail-joint embodying, in combination, rails having abutting ends and provided with heads and with flanges having inclined surfaces, a bar comprising a relatively thick but resilient medial section and end sections which are thinner and more resilient than said medial section and which are adapted to be flexed inwardly toward the rail, said end sections being gradually reduced in lateral thickness from approximately the central area of said medial section being offset, in untensioned condition, from the web and head of the rail and lying entirely inside the outer edge of the rail flange and having at their bottom ends portions which are disposed in substantially the same plane and which contact with the flanges of the rails, said bar being provided in its said untensioned condition at its said medial section with a bottom portion lying in the plane of said ends, and a longitudinally-cambered portion above the said bottom portion of the medial section, a part of which cambered portion is adapted in said untensioned condition to contact with the rail to provide a fulcrum about which the metal of the bar will be moved without undue stress localization upon inward flexing of the said end sections, and means for forcibly moving the flange-contacting end portions of said bar upwardly and inwardly on the inclined surfaces of the rail flanges to cause a straightening out of said longitudinally-cambered medial portion.

4. A rail-joint embodying, in combination, rails having abutting ends and provided with heads and with flanges having inclined surfaces, a bar comprising a relatively thick but resilient medial section and end sections which are narrower vertically and thinner laterally and more resilient than said medial section and which are adapted to be flexed inwardly toward the rails, said end sections being gradually reduced in lateral thickness from approximately the central area of said medial section and being in untensioned condition offset from the head and web of the rail and said bar having at the ends thereof bottom portions disposed in substantially the same plane and contacting with the flanges of the rails and lying inside the outer edge of the flanges, said bar being provided in said untensioned condition at its said medial section with a substantially rectilinear bottom portion lying in the plane of the bottom portion of the ends, and a longitudinally-cambered top portion above said rectilinear bottom portion, a part of which cambered portion is adapted in said untensioned condition to contact with the rail-head to provide a fulcrum about which metal of the bar will be moved without undue stress localization upon inward flexing of the end sections, and bolts for applying tension to move the end sections of said bar up the inclined surfaces of the rail flanges to cause said longitudinally cambered portion to be straightened out and said rectilinear bottom portion to be convexed.

5. A rail-joint embodying, in combination, rails having abutting ends and provided with heads and with flanges having inclined surfaces, a bar comprising a relatively thick but resilient medial section and end sections which are more resilient than said medial sections and which are adapted to be flexed inwardly toward the rails, said end sections being gradually reduced in lateral thickness from approximately the central area of said medial section and being in untensioned condition offset from the head and web of the rail and said bar having at the ends thereof bottom portions disposed in substantially the same plane and contacting with the flanges of the rails and lying entirely inside the outer edge of said flanges, said bar being provided in said untensioned condition at its said medial section with a substantially rectilinear bottom portion lying inside the vertical plane of the bottom portion of the ends and a longitudinally-cambered top portion above said rectilinear bottom portion, a part of which cambered portion is adapted in said untensioned condition to contact with the rail-head to provide a portion of the fulcrum about which the metal of the bar will be moved without undue stress localization upon inward flexing of the end sections, and bolts for applying tension to move the end sections of said bar up the inclined surfaces of the rail flanges to cause said longitudinally-cambered portions to be straightened out simultaneously.

6. A rail-joint embodying, in combination, opposing rail ends having heads and flanges provided with inclined surfaces, a bar comprising a resilient medial section of substantial thickness and end sections which grow gradually thinner laterally from approximately the central area of said medial section and which are more resilient than said medial section and which narrow vertically from a point within said medial section to allow vertical bending of portions of said medial section, said medial section having frictional and interlocking engagement between said rail heads and flanges at the adjacent ends of said rails whereby the bar impinges or seats at this point on the underside of said rail heads and on the upper side of said rail flanges to form a fulcrum relative to which the adjacent metal of the bar moves without undue stress localization upon inward flexing of said end sections, said end sections having flange contacting surfaces which lie in substantially the plane of the flange contacting surface of said medial section and which are adapted, upon being flexed, to travel inwardly and upwardly on said rail flanges whereby said end sections contact the rail flanges at varying levels differing sometimes from the level occupied by the flange engaging surface of said medial section, and bolts for drawing in said end sections to flex the same.

7. A rail-joint embodying, in combination, opposing rail ends having heads and flanges provided with inclined surfaces, a bar comprising a resilient medial section of substantial thickness, and end sections which grow gradually thinner laterally from approximately the central area of said medial section outward and which are more resilient than said medial section and which narrow vertically from a point within said medial section to allow vertical bending of portions of said medial section, said medial section having interlocking engagement between said heads and the rail flanges adjacent the ends of said rails whereby the bar impinges or seats at this point on the underside of said rail heads and on the upper side of said rail flanges to cause a concentration in this area of the supporting power of the bar and to form a fulcrum relative to which the adjacent metal of the bar moves without stress localization upon inward flexing of said end sections, said end sections having flange contacting surfaces which lie in approximately the plane of the flange contacting surfaces of said medial section and which are adapted, upon being flexed, to travel inwardly and upwardly on said flanges whereby portions of said bar are bowed vertically and whereby said end sections contact the rail flanges at varying levels differing from the level occupied by the flange engaging surface of said medial section, and bolts for drawing in said end sections to flex the same, said bolts being mounted in vertically elongated openings in said end sections whereby bending or shearing of the bolts is prevented as the end sections rise vertically during said inward flexing.

8. A rail joint embodying, in combination, opposing rail ends having heads and flanges provided with inclined surfaces, a bar comprising a resilient medial section of substantial thickness and end sections which gradually and uniformly decrease in thickness from approximately the central area of said medial section outwardly and which narrow vertically from a point within said medial section outwardly in such ratio to the thickness and height of said medial section as to prevent localization of stresses in any part of said end sections or said medial section, and to allow vertical bending of portions of said medial section, when under static or dynamic load, said medial section having frictional and interlocking engagement between said rail heads and flanges at or near the adjacent ends of said rails whereby the bar impinges or seats at this point on the underside of said rail heads and on the upper side of said rail flanges, said end sections having flange contacting surfaces which lie in substantially the plane of the flange contacting surface of said medial section and which are adapted, upon being moved inwardly, to travel upwardly on said flanges without localization of stresses and to contact the rail flanges at varying levels sometimes differing from the level occupied by a part of the flange engaging surface of said medial section, and bolts for drawing in said end sections to flex the same.

RICHARD F. GREENWOOD.